United States Patent [19]

Young

[11] Patent Number: 5,782,625
[45] Date of Patent: Jul. 21, 1998

[54] AUTOMATIC TENSIONER WITH ONE-PIN LOCKING MECHANISM

[75] Inventor: James D. Young, Chesaning, Mich.

[73] Assignee: Cloyes Gear & Products, Paris, Ak.

[21] Appl. No.: 568,657

[22] Filed: Dec. 7, 1995

[51] Int. Cl.⁶ ..................................................... F16H 7/12
[52] U.S. Cl. ............................................ 474/138; 474/110
[58] Field of Search ................................. 474/138, 110, 474/111, 132, 133–134, 137, 135, 136

[56] References Cited

U.S. PATENT DOCUMENTS

| | | |
|---|---|---|
| 3,812,733 | 5/1974 | Yoshida . |
| 4,457,741 | 7/1984 | Hoeptner, III .................. 474/138 |
| 4,695,268 | 9/1987 | Kodama et al. . |
| 4,850,941 | 7/1989 | Sosson . |
| 4,902,266 | 2/1990 | Ojima et al. .................. 474/138 X |
| 5,055,089 | 10/1991 | Ojima .................. 474/138 |
| 5,197,420 | 3/1993 | Arnold et al. .................. 474/110 X |
| 5,234,088 | 8/1993 | Hampton . |
| 5,277,664 | 1/1994 | Mott . |
| 5,370,584 | 12/1994 | Todd . |
| 5,512,019 | 4/1996 | Shimaya et al. .................. 474/110 |

*Primary Examiner*—David J. Bagnell
*Assistant Examiner*—Frederick L. Lagman
*Attorney, Agent, or Firm*—Fay, Sharpe, Beall, Fagan, Minnich & McKee

[57] ABSTRACT

A tensioner for adjustably exerting tension upon a flexible member such as a chain or belt. The tensioner comprises a housing having a piston cavity with an actuating piston reciprocally mounted therein. A spring biases the piston in a direction outwardly of the housing. Both the piston and the housing carry a guide shoe thereon for engaging the flexible member. The piston has a flat face cut therein that defines a first stop and a second stop. A pin is positioned parallel to the flat face to restrict axial movement of the piston to within the constraints of at least one stop, and to also prohibit rotational movement of the piston within the cavity.

16 Claims, 3 Drawing Sheets

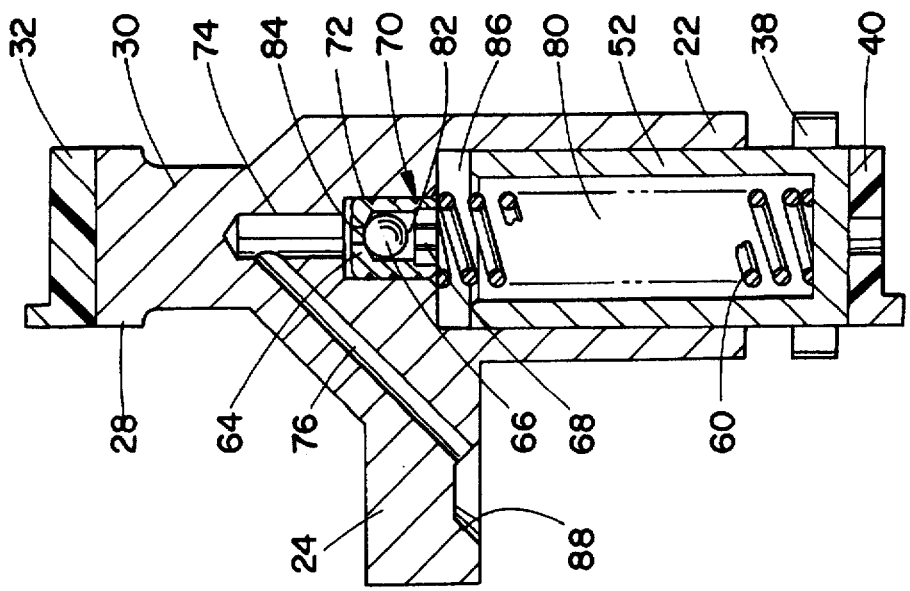
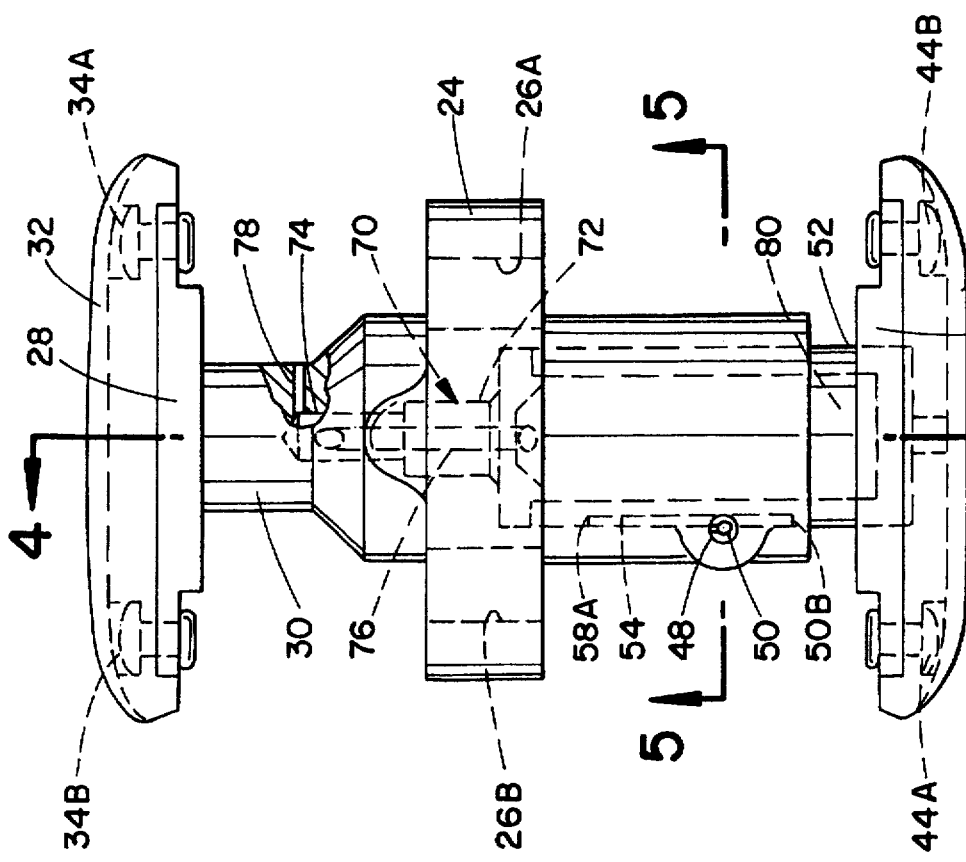

AUTOMATIC TENSIONER WITH ONE-PIN LOCKING MECHANISM

BACKGROUND OF THE INVENTION

The subject invention is directed to tensioners for maintaining, imposing or imparting tension in a belt such as a timing belt or the like, and more particularly, to a rotational and axial piston motion restriction mechanism. One use of such a tensioner is to maintain the tension placed upon a timing chain or belt in an engine where the chain or belt rotates between sprockets such as a crank shaft sprocket and a cam shaft sprocket, or a plurality of cam shaft sprockets.

Numerous tensioning devices for adjusting the tension in a belt are known in the art. One such use for these tensioning devices is with a chain or belt rotating between a cam shaft gear and a crank shaft gear. Another such use is with a chain or belt rotating between a two cam shaft gears in an internal combustion engine having multiple camshafts.

These tensioning devices, which are often hydraulic in nature, are used to impart and maintain a certain degree of tension in a chain or belt that rotates about at least two sprockets or pulleys, one driving the chain and one being driven. This certain degree of tension is required to prevent undesirable vibration of the chain or belt about the sprockets or pulleys. If the chain or belt is too loose, undesirable vibration will result. Vibration causes noise, produces excessive wear, and adds substantial stress and strain to the system. Noise, wear, stress and strain are all undesirable and result in a noisy and shortened camshaft drive life.

In addition, this certain degree of tension acts to prohibit or decrease the risk of the chain or belt jumping a tooth. Therefore, the risk of the timing being improper is reduced.

One type of tensioning device has a piston or plunger that is slidable within a cavity in a housing. The piston is typically biased to extend away from the base of the cavity such that the opposite end of the piston engages and places a certain degree of tension upon a chain or belt.

Many different types of chain tensioners are known in the prior art. These chain tensioners are satisfactory to a greater or lesser degree but often have certain inefficiencies or defects which make them unreliable, inefficient, complicated, inconvenient to use, or otherwise unsatisfactory.

SUMMARY OF THE INVENTION

In accordance with one aspect of the invention, there is provided a chain tensioner for exerting pressure on a flexible member such as a chain or a belt. The chain tensioner has a tensioner body with a housing and a piston that slides therein. A guide is attached to the housing and to the piston. A spring or other biasing mechanism pushes the piston away from the housing thereby forcing the guide on the piston against the flexible member. This pressure makes the flexible member more taut than before.

A pin transversely cuts across a flat face on the piston thereby prohibiting rotational movement of the piston about its longitudinal axis. This allows the guides to remain properly aligned with the flexible member. The pin also restricts axial motion of the piston between stops on the flat face thereby controlling the maximum separation between the guides.

Specifically, one of the stops defines a maximum distance of separation between the piston and the housing, thereby prohibiting the tensioner from disassembling. Also, the base of the cavity in the housing in which the piston slides acts as a minimum stop. Alternatively, the other stop on the flat face can also serve as a stop that defines a minimum distance of separation between the piston and the housing.

It is, accordingly, an object of the subject invention to provide a chain tensioner that supplies ample tension to the chain within defined maximum and minimum take-up capabilities.

It is another object of the invention to provide a chain tensioner that remains aligned with the chain (i.e., does not twist). This allows relatively smooth sliding of the chain or other flexible member such as a belt across the guides on the chain tensioner.

It is yet another object of the invention to provide a chain tensioner that is simple to manufacture and simple to use.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred alternative embodiments and methods of which will be described in detail in this specification and illustrated in the accompanying drawings which form a part hereof, and wherein:

FIG. 3 is a view of the chain tensioner of FIG. 1 taken looking at the mount 26;

FIG. 4 is a side sectional view of the chain tensioner of FIG. 1 taken along line 4—4 in FIG. 3.

DETAILED DESCRIPTION OF THE PREFERRED EMBODIMENT

Figure 1:
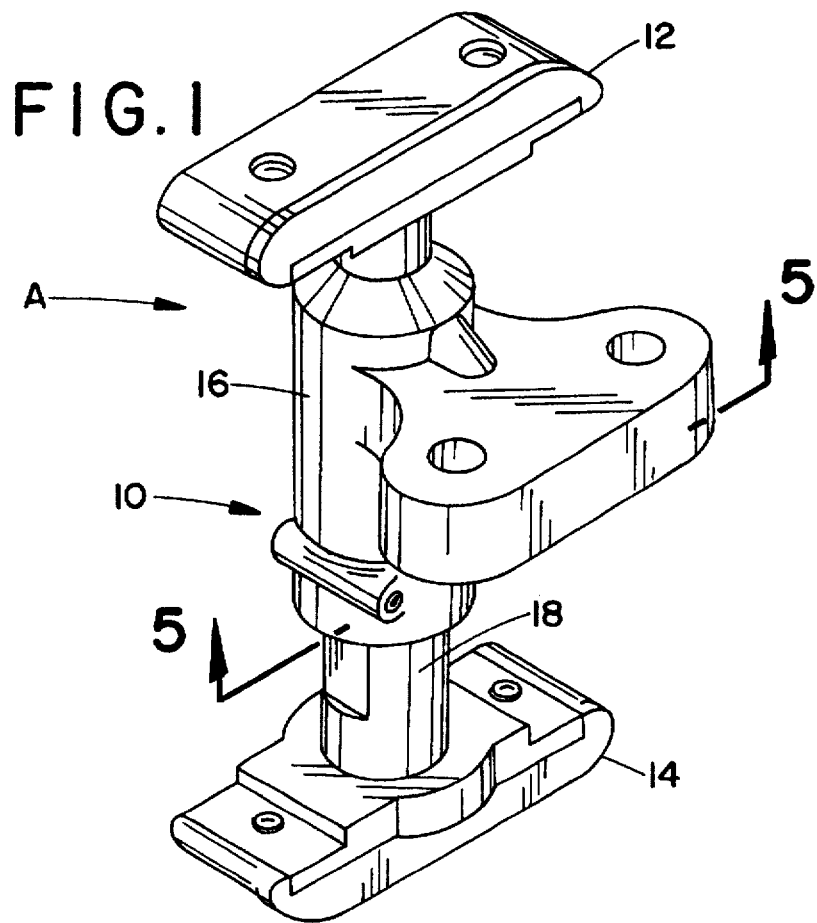
FIG. 1 is a perspective view of a preferred embodiment of an chain tensioning device.
Figure 2:
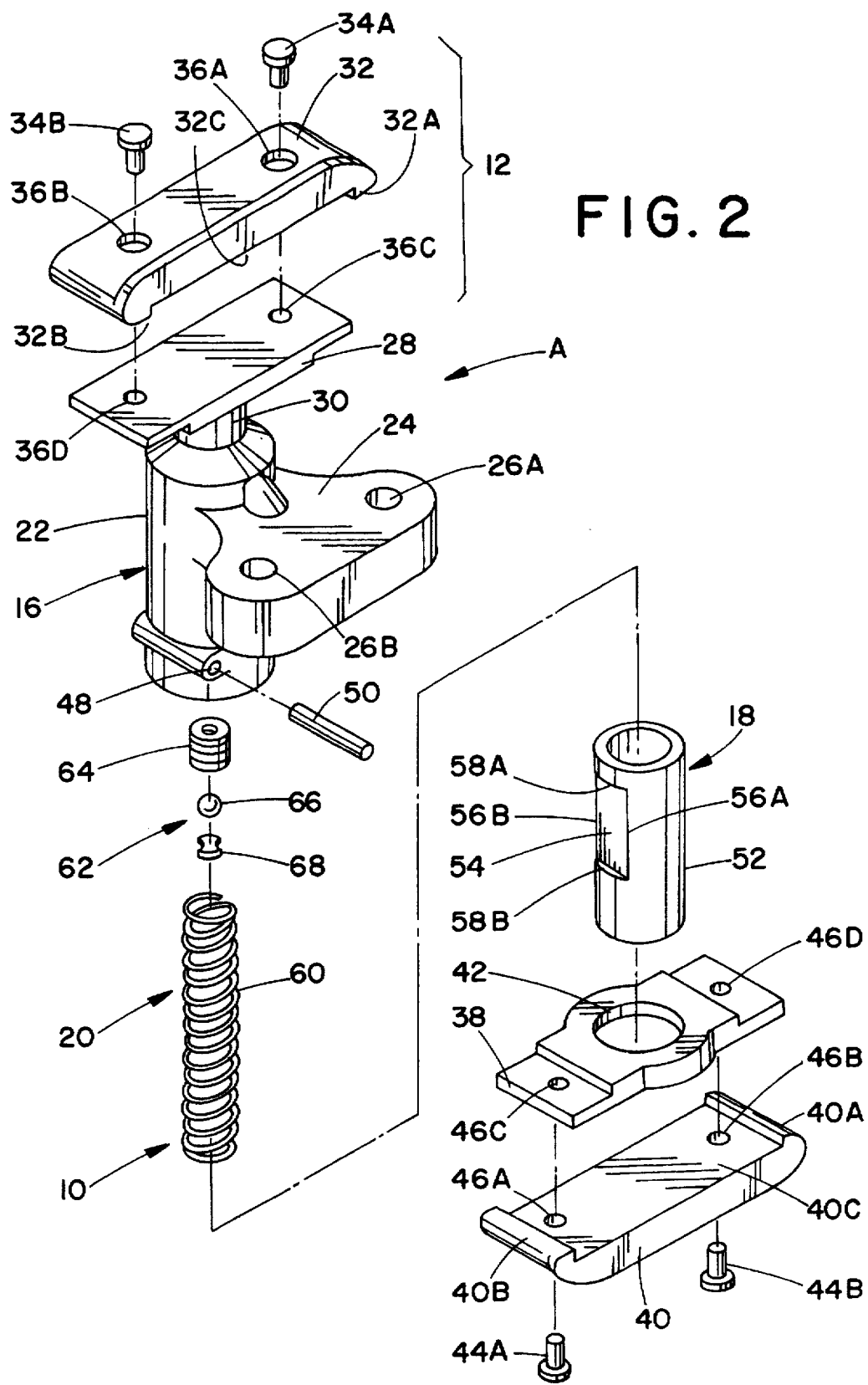
FIG. 2 is an exploded perspective view of the complete chain tensioner of FIG. 1.

Referring now to the drawings wherein the showings are for the purposes of illustrating the preferred embodiment of the invention only and not for purposes of limiting, the overall arrangement of the preferred construction of a chain tensioner A is shown generally in a perspective view in FIG. 1 and an exploded perspective view in FIG. 2. The invention can best be understood with reference to FIGS. 3–5 which show using cut away portions or hidden lines the inner workings of the chain tensioner A.

As illustrated in FIGS. 1–5, the chain tensioner A comprises a tensioner body 10, a fixed guide mechanism 12, and an adjustable guide mechanism 14. In use, a flexible member such as a chain or belt wraps around at least two rotating members such as sprockets or pulleys (the flexible member hereinafter referred to as a chain and the rotating members hereinafter referred to as sprockets). Typically, one sprocket is on the end of a cam shaft and the other sprocket is on the end of either another cam shaft or a crank shaft, although this tensioner could also be used outside of an internal combustion engine such as in a transmission, on an assembly line, or in any other situation where a chain is used to drive one sprocket with reference to another sprocket. The chain tensioner A is positioned in between the chain in such a manner that outward force can be placed on one or more portions of the chain. However, alternatively, the chain tensioner A could be positioned outside of the chain in such a manner that inward force could be placed on the chain.

Specifically, the tensioner body 10 pushes the adjustable chain guide mechanism 14 away from the fixed chain guide mechanism 12. The chain guide mechanisms 12 and 14 engage opposite chain strands of the chain thereby prohibiting dampening. This outward directed pressure is specifically required at a "cold start". Once the engine is running the tension is primarily a function of the feed oil pressure.

The various parts of the chain tensioner A are shown in more detail in FIG. 2. The tensioner body 10 includes a housing portion 16, a piston portion 18, and a biasing mechanism 20 for biasing the piston portion 18 away from the housing portion 16. The housing portion 16 includes a cylindrical housing 22 with a mount 24 extending out from the side of the housing 22 in a transverse manner. In a preferred embodiment, the mount 24 is substantially planar and is generally triangular in shape with rounded corners. Two fastener holes 26A and 26B extend completely through the mount 24 and receive fasteners such as bolts when the chain tensioner A is attached to an internal combustion engine for instance.

The fixed chain guide mechanism 12 is attached to the housing portion 16 of the tensioner body 10. The fixed chain guide mechanism 12 includes a guide mount 28 attached to one end of the housing 22 by a neck 30 for engaging the chain and thereby providing tension to the chain. Guide mount 28 is designed to receive and firmly hold a shoe 32 formed from polymeric material or other material having suitable wear-resistant and friction-reducing qualities. In one embodiment, the shoe 32 has a lip 32A and 32B at each end that wraps around guide mount 28 thereby defining a guide mount receiving area 32C. Preferentially, shoe 32 is fastened to guide mount 28 via a snap-fit arrangement. In an alternative embodiment, the shoes may be rivetted on. However, it should be understood that other fastening methods including adhesives and mechanical fasteners could be used.

In the embodiment as is shown in FIG. 2, shoe 32 is fastened to the guide mount 28 via rivets 34A and 34B that extend through holes 36A and 36B in the shoe 32 and holes 36C and 36D in the guide mount 28. The preferred embodiment of a snap-fit arrangement involves at least one keyhole shaped aperture in each of the shoes and one locking rod for each keyhole shaped aperture in each guide mount. Each rod having an enlarged head. The connection involves inserting the rod into the larger portion of the keyhole and then sliding the shoe so that the rod moves into the smaller diameter portion thereby locking the shoe to the guide mount.

The adjustable chain guide mechanism 14 is similar to the fixed chain guide mechanism 12 in that mechanism 14 includes a guide mount 38 in which the piston portion 18 seats, and a shoe 40 attached to said piston. The guide mount 38 is designed to receive the piston portion 18. In the preferred embodiment, the guide mount 38 includes a circular support 42. One end of the piston portion 18 is seated within the circular support 42, while the other end of the piston portion 18 slides within a cavity in the housing portion 16.

The guide mount 38 is also designed to receive and firmly hold the shoe 40. The shoe 40 is formed from polymeric materials or other materials having suitable wear-resistant and friction-reducing qualities. The shoe 40 has a lip 40A and 40B at each end that wraps around guide mount 38 thereby defining a guide mount receiving area 40C. As with shoe 32, shoe 40 is preferentially snap-fit to guide mount 38 although other methods such as rivetting may be used. In the embodiment as is shown in FIG. 2, shoe 40 is fastened to the guide mount 38 via rivets 44A and 44B that extend through holes 46A and 46B in the shoe 40 and holes 46C and 46D in the guide mount 38.

The adjustable chain guide mechanism 14 is attached to the piston portion 18 of the tensioner body 10 and therefore actuates with reference to the housing portion 16 in contrast to the fixed chain guide mechanism 12 which is fixed in relation to the housing portion 16.

The housing 22 has a transverse bore 48 offset on the housing and extending completely through the housing. The bore 48 receives a pin 50 which acts to prohibit rotational movement while restricting axial movement of the piston portion 18 while the piston portion is within the housing 22. In the preferred embodiment, the pin 50 is a roll pin.

The piston portion 18 includes a piston 52 that is substantially cylindrical with a flat top and bottom. A flat face 54 is cut in the cylindrical side and defines edges 56A and 56B extending longitudinally along the cylindrical surface of the piston 52 and the flat face 54. The flat face 54 further defines ridges 58A and 58B extending transversely across the cylindrical piston 52 and forming the ends of the flat face 54. As is described below in more detail, the edges 56A and 56B prohibit rotational movement of the piston 52 within the housing portion 16, while the ridges 58A and 58B restrict the axial movement of the piston 52 within the housing portion 16, although preferentially the piston 52 will bottom out before pin 48 abuts ridge 58B. Therefore, ridge 58B is not required. The piston portion 18 is biased away from the housing portion 16 by the biasing mechanism 20 within the constraints of ridges 58A and 58B. The biasing force presses at least the adjustable chain guide mechanism 14 into contact and engagement with the chain thereby exerting pressure on the chain. This pressure keeps the chain taut and under a desired tension, particularly when the engine is not running or at the time of cold starting when there is no hydraulic fluid pressure. However, the piston portion 18, although biased away from the housing portion 16, actuates axially within the housing portion 16 within the constraints of ridges 58A and 58B in response to the tension within the chain. Specifically, the piston portion 18 actuates axially into the housing portion 16 in response to an increased tension in the chain, while the piston portion 18 actuates axially out of the housing portion 16 in response to decreased tension in the chain.

The biasing mechanism 20 includes a spring 60 and a ball valve 62. The ball valve 62 includes a seat body 64, a ball 66, and a ball lock 68. As shown in FIGS. 3 and 4, the seat body 64 of the ball valve 62 seats within a bore 70 in the base of the housing portion 16. The seat body 64 in one embodiment has grooves about its outside perimeter. The ball 66 is seated within the seat body 64 and locked therein by ball lock 68.

FIGS. 3 and 4 show the bore 70 in the base of the housing portion 16 where the bore includes a larger diameter portion 72 for receiving the ball valve 62, and a smaller diameter portion 74 with a shoulder therebetween. The smaller diameter portion 74 includes two ports therein, one port to a lubrication conduit 76 for providing lubricant such as oil for the chain tensioner A, and a second port to a small conduit 78 for overflow and pressure stabilization.

FIGS. 3 and 4 display the tensioner body 10 fully assembled. FIG. 3 is a front view with various internal components such as the piston 52, the bore 70, and the conduits 76 and 78 shown in part or in dashed lines. FIG. 4 is a side sectional view showing the inner workings of the chain tensioner A.

Specifically, FIG. 3 shows the shoe 32 attached to guide mount 28 on housing portion 16. The shoe 40 is shown attached on guide mount 38 with piston portion 18 seated in circular support 42 in guide mount 38. The rivets 34A and 34B, and 44A and 44B, as are shown in the FIGURE preferential snap-fit arrangement, or alternatively hold the respective shoes 32 and 40 to the respective guide mounts 28 and 38. These snap-fit arrangements and rivets are countersunk within the shoes.

The axial movement restriction of the piston 52 within the housing portion 16 is shown where the pin 50 and the flat face 54 interact. The pin 50 fits against the flat face 54 and edges 56A and 56B in such a manner that the piston 52 is prohibited from rotating within the housing portion 16, while the piston 54 is axially movable within the housing portion 16 within the constraints of ridges 58A and 58B. In this regard, ridge 58A provides an ejection restricted for restricting outward movement of the first shoe. Similarly, ridge 58B represents a compression restricter for restricting inward movement of the first shoe.

The tension in spring 60 results in the biasing of the piston 52 away from the housing portion 16 resulting in the pin 54 interacting with ridge 58A, i.e., spring 60 biases piston 52 away from housing portion 16 while ridge 58A defines the maximum separation distance. However, when the chain tensioner is loaded and acting against a chain, the tension in the spring is partially or fully overcome resulting in piston 52 being compressed and forced further into the housing portion 16. The chain counteracts the tension of the piston 52 in varying degrees during operation. The result is the axial movement of the piston 52 within the housing portion 16 within the constraints of ridge 58A and a bottomed out piston 52 (or between ridges 58A and 58B). If sufficient counteraction occurs, the tension from the spring 60 can be fully overcome, resulting in the piston 52 moving inward within the housing portion 16 until piston 52 bottoms out in the base of housing portion 16 (or until pin 54 engages ridge 58B).

FIG. 4 shows the biasing mechanism 20 in more detail. The piston 52 includes a hollow interior 80 housing the spring 60. The piston 52 is inserted into the cavity in the housing portion 16 such that the open end of the piston 52 faces into the cavity. The spring 60 extends out of the hollow interior of the piston 52 and rests against the base of the cavity against or around the seat body 64 in the bore 70.

The ball valve 62 is shown in more detail in FIG. 4. The ball valve 62 includes the seat body 64, the ball 66, and the ball lock 68. The seat body 64 of the ball valve 62 seats within the bore 70 in the base of the housing portion 16. The seat body 64 includes an inner chamber 82 with an open end for receiving ball lock 68, a central bore, and a conical base. The seat body 64 also includes a duct 84 extending from the conical base in the inner chamber 82 to the outside surface of the seat body 64. The ball 66 is seated within the inner chamber of the seat body 64 and locked therein by ball lock 68. The inner chamber is larger in dimensions than the ball 66 and thus the ball moves within the inner chamber. The ball lock 68 is generally circular in shape with two generally arcuate cuts removed. These cuts allow oil to pass through the inner chamber, i.e., from the lubrication conduit 76 through the smaller diameter portion 74, the duct 84, the inner chamber 82 (around the ball 66), the two arcuate cuts, and into a cylinder 86 in the housing portion 16 (the cylinder receives the piston 52) and the hollow interior 80 in the piston 52.

The ball valve 62 functions to allow hydraulic fluid to flow into the cylinder 86 and the hollow interior 80 while prohibiting flow back out of the cylinder 86 and the hollow interior 80. The ball valve 62 acts as a shock dampener whereby the compression of the piston 52 into the cylinder 86 due to increased forces on the chain is offset by the ball 66 seating in the conical base of the seat body 64 thereby prohibiting hydraulic fluid flow back into the smaller diameter portion 74 and the lubrication conduit 76. At the same time, this allows the hydraulic fluid to flow into the area of frictional interaction (i.e., the area where the piston 52 interacts with the cylinder 86). This acts to counteract the force of the piston 52 pushing onto the cylinder 86. The helical seat body 64 functions to allow hydraulic dampening by allowing fluid to escape around seat body 64 along bore 70 under feedback loading conditions. It is this hydraulic fluid pressure that defines the tension in the chain during operation of the engine. Typically, this hydraulic fluid is the engine oil but it may be another fluid.

Figure 5:
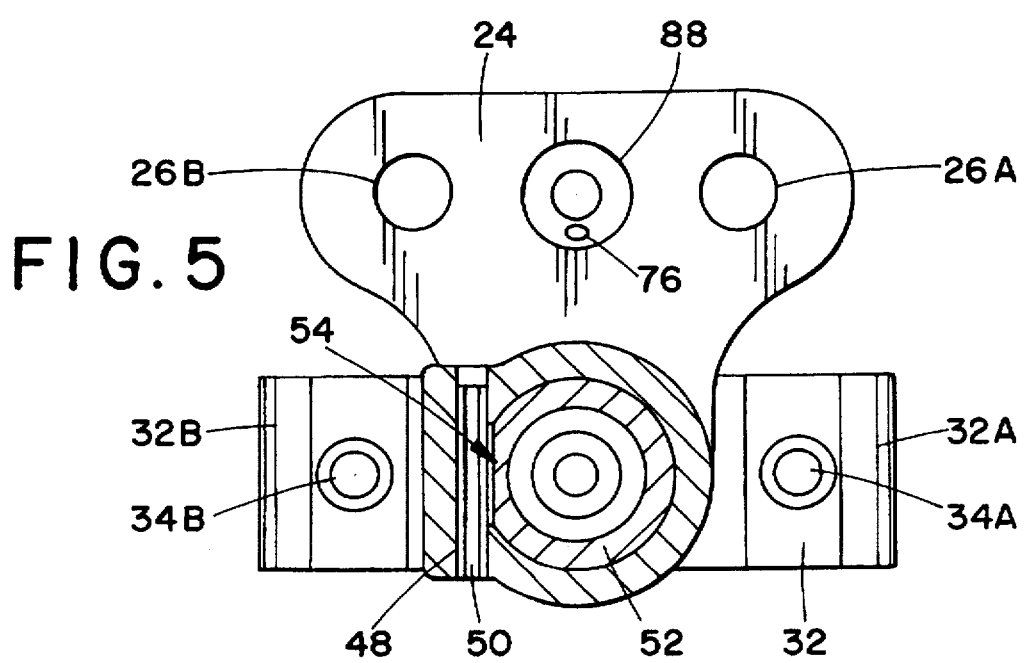
FIG. 5 is a partially sectional view of the chain tensioner of FIG. 1 taken along line 5—5 in FIGS. 1 and 3.

FIG. 5 shows the entrance port to the lubrication conduit 76 which is in a bowl or indentation 88 in one side of the mount 26. This bowl 88 is located in between the fastener holes 26A and 26B.

FIG. 5 also shows the pin-piston interaction which restricts axial movement of the piston 52 within the cylinder 86 to within the constraints of the first and second stops or ridges 58A and 58B, and for prohibiting rotational movement of the piston 52 within the cylinder 86. When the piston 52 is properly positioned in the cylinder 86 such that the flat face 54 is parallel and adjacent to the transverse bore 48, the pin 52 is inserted into transverse bore 48 in the cylindrical housing 22.

The edges 56A and 56B prohibit rotational movement of the piston 52 within the housing portion 16. In addition, the ridge 58A and a bottomed out piston 52 (or alternatively ridges 58A and 58B) restrict the axial movement of the piston 52 within the housing portion 16. The result is the chain tensioner A exerts a force upon the chain up to a certain limit (i.e., where the pin 52 is engaged against the ridge 58A). This force is created by the spring 60 which is compressed and therefore exerts an outward force separating the piston 52 from the housing portion 16. However, sufficient torque from the internal combustion engine can cause the chain to tighten thereby exerting a pressure upon the piston 52 in excess of the spring compression resulting in the movement of the piston 52 inward into the cylinder 86 up to the constraint of a bottomed out piston 52 (or to abutment of ridge 58B).

The piston portion 18 is biased away from the housing portion 16 by the biasing mechanism 20 within the constraints of ridges 58A and 58B. This biasing presses at least the adjustable chain guide mechanism 14 into contact and engagement with the chain thereby exerting pressure on the chain. This pressure makes the chain taut thereby keeping substantial frictional contact between the sprockets and the chain. However, the piston portion 18, although biased away from the housing portion 16, actuates axially within the housing portion 16 within the constraints of ridge 58A and the bottom of the housing (or ridges 58A and 58B) in response to the tension within the chain. Specifically, the piston portion 18 actuates axially into the housing portion 16 in response to an increased tension on the chain, while the piston portion 18 actuates axially out of the housing portion 16 in response to a decreased tension on the chain.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A tensioning apparatus for adjustably exerting tension upon a flexible member comprising:

a housing including a base and defining a longitudinal piston cavity therein, and said piston cavity having a pin aperture transversely defined therein;

a piston with a longitudinal axis having a generally arcuate outer surface with a flat face cut therein defining at least one stop;

biasing means for biasing the piston away from the base; and a pin located in the pin aperture and extending substantially parallel to the flat face to thereby prevent rotation of the piston about its longitudinal axis.

2. The tensioning device as set forth in claim 1 the biasing means comprises a spring.

3. The tensioning device as set forth in claim 1 wherein the flat face on the piston further includes a first edge and a second edge.

4. The tensioning device as set forth in claim 1 wherein the piston cavity in the housing includes a base and a piston-engaging wall, and said piston-engaging wall having the pin aperture transversely defined therein.

5. The tensioning device as set forth in claim 1 further comprising a guide attached to the piston for exerting tension upon a flexible member.

6. The tensioning device as set forth in claim 5 further comprising a guide attached to the housing for exerting tension upon a flexible member.

7. The tensioning device as set forth in claim 1 wherein the housing further includes a conduit for supplying pressurized fluid to the piston cavity.

8. The tensioning device as set forth in claim 7 wherein the piston cavity in the housing includes a base and a piston-engaging wall, and the housing further includes a valve for regulating fluid flow in the base.

9. A tensioning apparatus for adjustably exerting tension upon a chain comprising:

a first shoe for engaging the chain upon which tension is to be exerted;

a second shoe also for engaging the chain upon which tension is to be exerted;

the first and second shoe cooperating through a piston and housing;

biasing means for biasing the second shoe away from the first shoe;

a rotation restricter, including a flat face on the piston and a pin extending substantially parallel to the flat face, for substantially prohibiting rotation of the second shoe with reference to the first shoe; and an axial restricter for restricting movement of the first shoe with reference to the second shoe to within a predetermined axial movement range.

10. The tensioning apparatus as set forth in claim 9 wherein the axial restricter further comprises:

an ejection restricter for restricting outward movement of the first shoe with reference to the second shoe beyond a preselected maximum distance between the first and second shoes; and a compression restricter for restricting inward movement of the first shoe with reference to the second shoe beyond a preselected minimum distance between the first and second shoes;

whereby the second shoe is continuously axially adjustable in reference to the first shoe within the constraints of the ejection and compression restricters.

11. The tensioning apparatus as set forth in claim 9 further comprising a piston upon which the second shoe is attached whereby said piston is slidable within a piston cavity in the housing.

12. The tensioning apparatus as set forth in claim 11 further comprising a piston upon which the second shoe is attached whereby said piston is slidable within a piston cavity in the housing.

13. A tensioning apparatus for adjustably exerting tension upon a flexible member comprising:

a housing defining a longitudinal piston cavity therein having a piston-engaging wall and a base, said housing further defining a pair of apertures;

a cylindrical piston slidably positioned within the piston cavity and defining a flat face thereon;

a biasing means for biasing the piston away from the base; and a pin insertable through the apertures and adjacent the flat face for both restricting axial movement of the piston within the cavity to within the constraints of the flat face, and prohibiting rotational movement of the piston within the cavity.

14. The tensioning apparatus as set forth in claim 13 wherein the pin engages the flat face in the piston when inserted through the apertures and adjacent the flat face.

15. A tensioning apparatus for adjustably exerting tension upon a flexible member comprising:

a housing including a base and defining a longitudinal piston cavity therein, and said piston cavity having a pin aperture transversely defined therein;

a piston with a longitudinal axis having a generally arcuate outer surface with a flat face cut therein defining at least one stop;

biasing means for biasing the piston away from the base; and a pin located in the pin aperture;

wherein the piston cavity in the housing includes a first hole and a second hole through the housing, said holes being positioned cavity in the housing includes a first hole and a second hole through the hosing, said holes being positioned on substantially opposed portions of the piston cavity, and said holes being aligned to receive the pin.

16. A tensioning apparatus for adjustably exerting tension upon a flexible member comprising:

a housing including a base and defining a longitudinal piston cavity therein, and said piston cavity having a pin aperture transversely defined therein;

a piston with a longitudinal axis having a generally arcuate outer surface with a flat face cut therein defining at least one stop;

biasing means for biasing the piston away from the base; and a pin located in the pin; aperture wherein the pin aperture includes a pair of openings extending transversely through said piston cavity and defining a pin insertion passageway substantially parallel and adjacent to said flat face.

* * * * *